Oct. 18, 1960   C. A. HERBST   2,956,309
METHOD OF MOLDING A PLASTIC
Filed March 13, 1957   2 Sheets-Sheet 1

Inventor:
Clarence A. Herbst
By: Schroeder, Hofgren,
Brady & Wegner
Attorneys

Oct. 18, 1960     C. A. HERBST     2,956,309
METHOD OF MOLDING A PLASTIC
Filed March 13, 1957     2 Sheets-Sheet 2
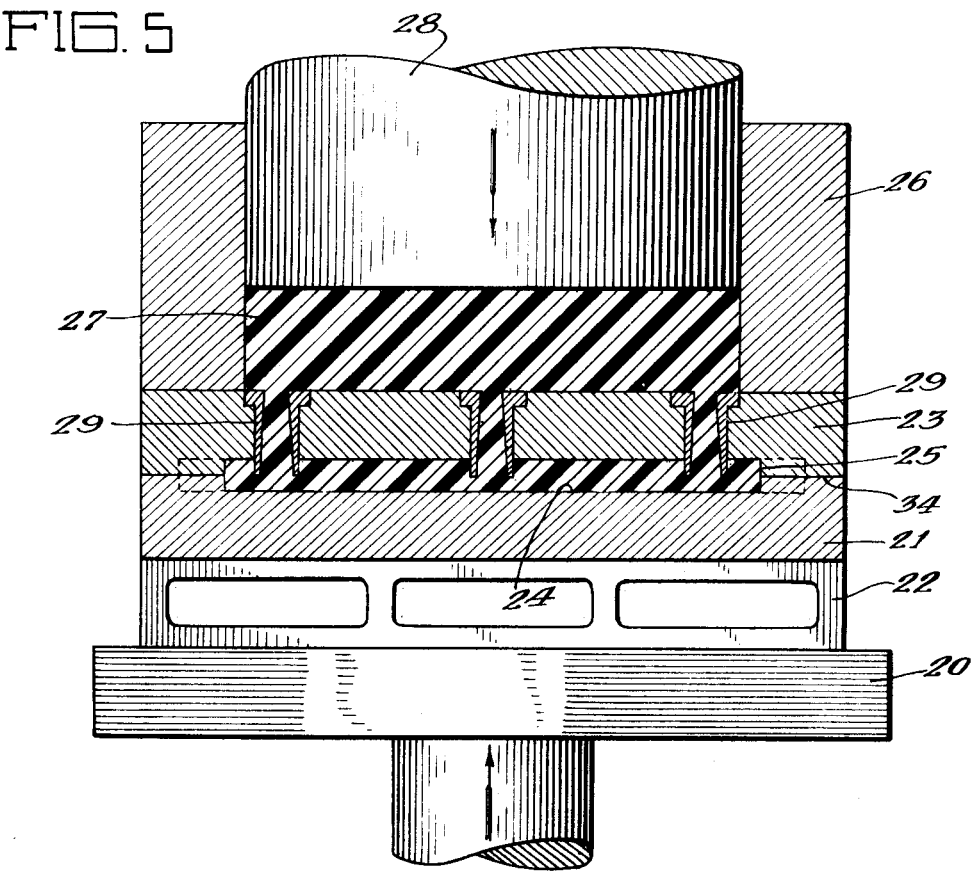
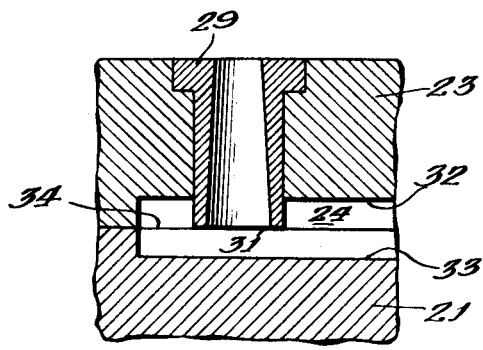
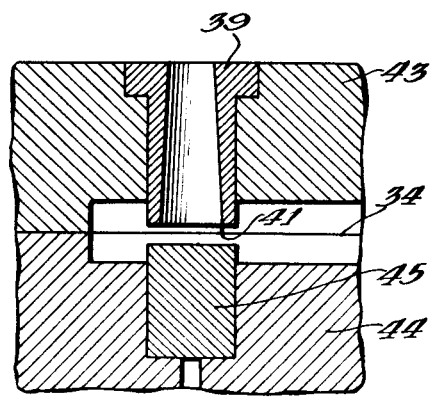
Inventor:
Clarence A. Herbst
By: Schroeder, Hofgren,
Brady & Wegner
Attorneys

United States Patent Office 2,956,309
Patented Oct. 18, 1960

2,956,309

METHOD OF MOLDING A PLASTIC

Clarence A. Herbst, Park Ridge, Ill., assignor to Resinoid Engineering Corporation, a corporation of Illinois Filed Mar. 13, 1957, Ser. No. 645,732

4 Claims. (Cl. 18—55)

This invention relates to a method of molding plastics and more particularly to a transfer molding procedure to obtain greater dimensional conformity between a molded member and its mold cavity.

This application is a continuation-in-part of my copending application, Serial No. 342,499, filed March 16, 1953, now Patent No. 2,793,152, entitled "Spacer and Method of Making Same."

Molds for making plastic members are built to withstand repeated use in production and are capable of opening for removal of the molded members. The dimensions of the mold cavity are generally held within quite close tolerances and can be made quite accurately. The members which are molded in the cavities, however, do warp and otherwise change their dimensions when cooled. The efforts expanded to make the mold cavity quite accurately in its dimensions, are of no avail if the plastic member formed in the cavity will not retain the shape and dimensions of the cavity.

In the past, plastic members which had to be made to close tolerances have sometimes been made oversized and then machined to accurate dimensions. Such procedures require additional equipment and time as well as the expense of personnel, all adding to the expense of the item produced.

The present invention provides an improved method of transfer molding a thermosetting plastic so that warpage is held to a minimum and generally within tolerances such that machining may be dispensed with. The savings effected in avoiding machining will be immediately recognized.

The primary object of this invention is to provide a new and improved method of molding a plastic member.

Another object is to provide a molding procedure for thermosetting plastics capable of minimizing the amount of warpage or other dimensional change of the molded plastic member upon being cooled.

Another object of the invention is to provide a method of forming a plastic carburetor spacer with opposite faces so nearly parallel over a relatively wide extent, to avoid the necessity of grinding the faces to parallelism.

Figure 1:
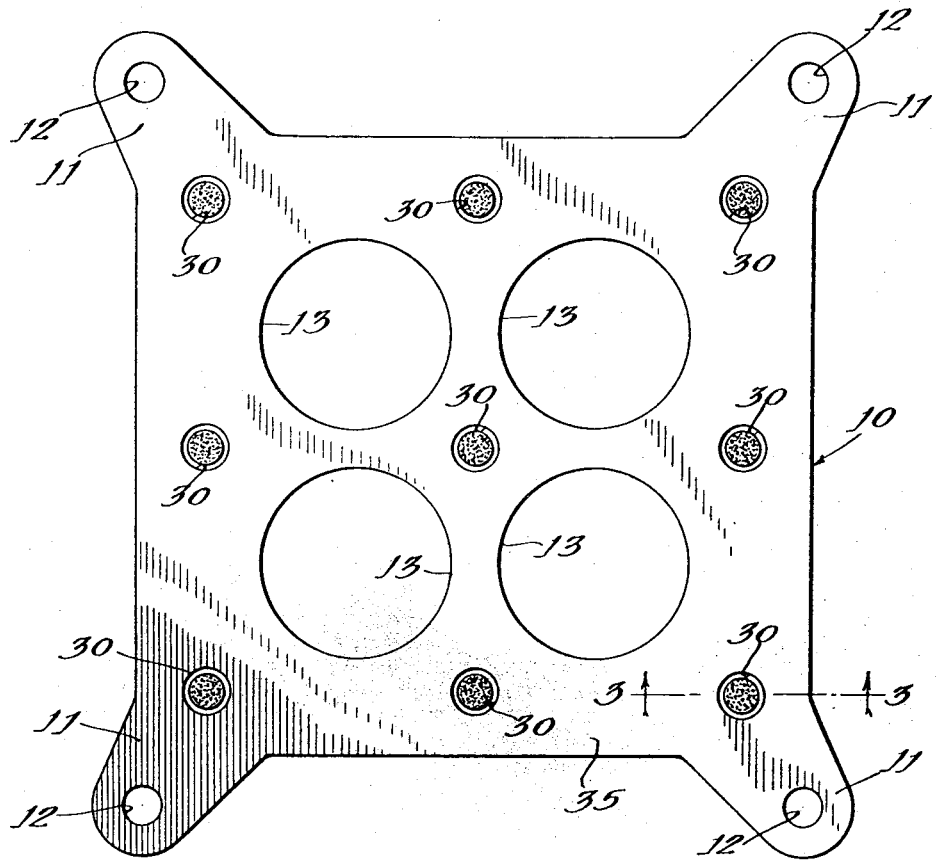
Figure 2:
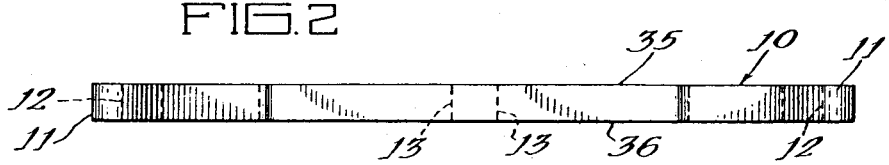
Figure 3:
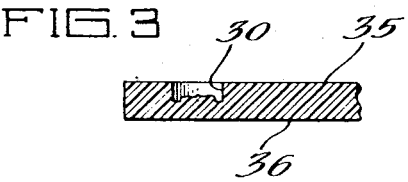
Figure 4:
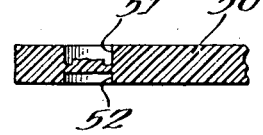

Other objects, features and advantages of the present invention will be apparent from the following description of a preferred molding procedure described in conjunction with the accompanying drawings, in which:

Figure 1 is a plan view slightly enlarged of a carburetor spacer made by the methods of this invention, Figure 2 is a side elevational view of the spacer shown in Figure 1, Figure 3 is a fragmentary sectional view through the spacer taken substantially along line 3—3 in Figure 1, Figure 4 is a fragmentary view similar to Figure 3 illustrating another form, Figure 5 is a diagrammatic sectional view through a transfer mold illustrating steps in the method of forming the spacer of Figure 1, Figure 6 is a fragmentary enlarged sectional view through a portion of a mold for forming plastic members in accordance with the invention, and Figure 7 is a view similar to Figure 6 of a mold for forming the member illustrated in Figure 4.

The specific product chosen for purposes of illustrating the invention is a carburetor spacer formed of a thermosetting resin having an asbestos or other mineral filler. The dimensions of the spacer are particularly important since the thickness of the spacer should be uniform in order to provide proper spacing and sealing. A carburetor spacer is used to insulate the carburetor of an internal combustion engine from the intake manifold upon which it may set. In the automobile industry, there has been a concerted effort to lower the hoods over the engine compartments resulting in lowering of the air filter and carburetor parts which generally are the uppermost equipment on the engine. As a result of this effort and the effort to increase the size and power of the engine, larger carburetors are being used. For example, a four barrel carburetor may have a bottom flange of around 6 inches in width and length requiring a spacer of similar dimensions. The flange of the carburetor is ground to substantial flatness; however, experience has indicated that often the flange is made with a concavity of several thousandths of an inch. Should the mating flange on the intake manifold also have a concavity, the problem of sealing a spacer between these flanges becomes increasingly difficult.

In Figure 1, a spacer generally indicated 10, is shown with four outwardly extending ears 11, each containing a bolt opening 12 by which the spacer is secured between the mating flanges of a carburetor and an intake manifold. The spacer has four large central openings 13 which are the openings through which the gasoline and air mixture is fed from the carburetor into the intake manifold of an engine. The peripheries of the central openings 13 should be tightly sealed with both flanges. Ordinarily, the spacer is of a hard material so as to withstand the crushing effect of the corner securing bolts. A very thin neoprene gasket may be placed on either face of the spacer in order to insure such sealing effect.

In the past, the spacers which have been molded of a thermosetting plastic have required grinding on its opposite faces in order to bring the thickness of the spacer to uniformity. In other words, in order to get the opposite faces parallel, a grinding of them was necessary. Generally, from 6 to 8 thousandths of an inch of material had to be removed from each face of the spacer so that the faces would be parallel and the neoprene gaskets would be capable of accommodating any irregularities encountered in the mating flanges of carburetor and manifold.

The difficulty in securing a flat spacer having parallel faces was directly attributed to the fact that the plastic molded member would warp and shrink when cooled so that it no longer was flat as it was in the cavity of the mold. The mold cavities are formed with opposite faces in parallelism; however, the piece molded in the cavity must retain its flatness in order to be used without further machining. The present invention provides a solution to this problem of warpage and shrinkage.

A transfer molding procedure is illustrated diagrammatically in Figure 5, wherein a press platen 20 supports a lower mold 21 upon a grid 22 in position to mate with an upper mold 23 forming the cavity 24 between them. As illustrated, a spacer 25 is being formed within the cavity. A press head 26 provides a space 27 for the reception of molding compound which is forced by a plunger 28 through sprue plugs 29 into the cavity. When the cavity is filled, the plunger provides high pressure on the material in the cavity through the sprue plugs. Referring to Figure 1, a sufficient number of sprue plugs 29 are positioned to allow the material to enter the cavity in a symmetrical pattern. The openings 30 left in the spacer after removal of the sprues are best seen in Figure 3. Nine of the openings are symmetrically arranged, as illustrated in Figure 1.

The particular location of the sprue plugs provides a molding procedure which will produce a plastic member avoiding the difficulty of shrinkage and warpage mentioned above. In general, the molding procedure involves the flowing of the plastic material into the cavity at points between and spaced from the faces of the cavity. This procedure orients the lines of flow from within the cavity toward the outer faces. The pressure applied to the material in the cavity emanates through the sprue plugs so that it is applied intermediate the faces of the cavity. Stress concentration is placed between the faces and preferably in a position to be in balance between opposite faces of the cavity and thus of the spacer.

Referring to Figure 6, it will be noted that the sprue plug 29 has its inner end 31 about midway between the upper face 32 and lower face 33 of the cavity. Actually, the illustration of Figure 6 shows the inner end of the sprue plug directly on the parting line 34 between the upper and lower molds. Material forced into the cavity 24 thus will have all stress concentration generally between the two faces which are to be maintained parallel and the stresses will be in substantial balance between these faces.

The spacers made in accordance with the present invention may, for example, have a thickness from .200 to .250 inch and a width in excess of 6 inches. Warpage of the spacer has repeatedly been held within a tolerance of less than 1/64" out of flatness so that tightening of the bolts in assembling the spacer on an engine is sufficient to bend the spacer to absolute flatness. The neoprene gaskets ordinarily used do not exceed .030" in thickness and can only be compressed to about .018" so that there is a definite limit to the amount of concavity that the gaskets will accommodate. Spacers made in accordance with this invention have required no grinding of the opposite faces, such as 35 and 36 shown in Figures 2 and 3, since the pieces can be held so close in dimension and shape to that of the cavity.

Some spacers have been made with considerably greater thickness, for example, up to ½" and by following the procedures of this invention they can also be held within 1/64" warpage. Such spacers may sometimes be used as molded and in any event, the invention provides a spacer which requires much less grinding than heretofore required.

Figures 4 and 7 illustrate an embodiment of the invention differing only with respect to the entry of the material into the cavity. In Figure 7, the upper mold 43 has the sprue plug 30 placed in substantially the same manner described above. Its inner end 41 is slightly above the parting line 34 between the upper mold and lower mold 44 so that a plug 45 may be placed in the lower mold just opposite the sprue plug 39. The plug 45 insures that the incoming material flows from the center or central portion of the mold cavity toward each of the opposite faces. The result of this molding procedure will provide a spacer 50, as illustrated in Figure 4. The opening 51 is left by the sprue plug and the opposite opening 52 is left in a spacer by the plug 45. It will be readily understood that the openings such as 30 and 51 are not objectionable since they are in the spacer at locations away from the central barrels 13 and do not affect the functioning of the member.

In the present molding procedure, it is important that the material be introduced away from the surface of the piece to be molded. As mentioned, preferably the material should be introduced in a position between the faces of the cavity such that the stress concentration will be in balance between the faces of the piece formed. In this manner, warpage and shrinkage of the molded member are materially minimized. The usual setting procedures are followed, the material being set while the pressure is maintained with its attendant stress concentration, along with the application of heat, so that the material will cure. Many other shapes may be formed so that they will conform in dimensional characteristics to the dimensions of their respective mold cavities, by following the procedures of this invention.

The foregoing detailed description has been given for clearness of understanding only, and no unnecessary limitations should be understood therefrom, for some modifications will be obvious to those skilled in the art.

I claim:

1. The method of molding a relatively thin plastic member having comparatively extensive width and length many times its thickness so that the member will retain dimensions and shape of its mold cavity without appreciable warpage, comprising the steps of introducing thermosetting resin material through one of the mold walls forming the extensive width and length of the member, said material being introduced into the cavity at each of a plurality of points located generally midway between closely spaced cavity faces defining the thin dimension of the member, flowing the resin material into the cavity under pressure laterally from said points of introduction so as to establish flow lines laterally between said cavity faces and outwardly toward said faces from the central part of the cavity, continuing the pressure until the entire mold is filled whereby the stresses between the points of introduction and adjacent mold faces are substantially balanced, then setting the resin material.

2. The method of molding a relatively thin plastic member having comparatively extensive width and length many times its thickness so that the member will retain dimensions and shape of its mold cavity without appreciable warpage, comprising the steps of introducing thermosetting resin material into the cavity at a plurality of points including one at the center and others located symmetrically about the center, the material being introduced through a cavity wall defining the width and length of the member so as to enter the cavity generally midway between closely spaced faces defining the thin dimension of the member, flowing the resin material under pressure into the cavity so as to establish flow lines laterally from said points of introduction and outwardly toward said faces from the central part of the cavity, continuing the pressure until the cavity is filled whereby stresses between each point of introduction and adjacent mold faces are substantially balanced, then setting the resin material.

3. The method of molding a relatively thin plastic member having a relatively extensive length many times its thickness so that the member will retain the shape of its mold cavity and will not warp appreciably in the direction of its thin dimension comprising the steps of introducing thermosetting resin material into a mold cavity at each of a plurality of points located generally midway intermediate closely spaced mold faces defining the thin dimension of the member, said material being introduced through at least one of said mold faces, flowing the resin material into the cavity under pressure laterally from said points of introduction and outwardly from the central part of the cavity toward said mold faces, continuing the pressure until the entire mold is filled, then setting the resin material.

4. The method of molding a relatively thin plastic member in a closed mold having closely spaced faces of relatively extensive length so that the plastic member will not warp appreciably in the direction of its thin dimension comprising the steps of introducing thermosetting resin material into a mold cavity through one of said mold faces and at a point spaced generally midway between said mold faces, flowing the material into the cavity under pressure laterally from the point of introduction and outwardly from the central part of the mold toward said mold faces, continuing the pressure until the entire mold is filled whereby the stresses between said point of introduction and adjacent mold faces are substantially balanced, then setting the resin material.

References Cited in the file of this patent

UNITED STATES PATENTS

| | | |
|---|---|---|
| 2,224,852 | Lowry | Dec. 17, 1940 |
| 2,360,023 | Tucker | Oct. 10, 1944 |
| 2,372,177 | Conner | Mar. 27, 1945 |
| 2,649,622 | Piccard | Aug. 25, 1953 |
| 2,686,935 | Stott | Aug. 24, 1954 |
| 2,755,508 | Maccaferri | July 24, 1956 |

FOREIGN PATENTS

| | | |
|---|---|---|
| 549,556 | France | Nov. 23, 1922 |